FIG. I

INVENTOR.
FRANK H. RICHTERKESSING
BY John L. Milton
ATTORNEY

INVENTOR
FRANK H. RICHTERKESSING
BY John L. Milton,
Attorney

United States Patent Office 2,816,370
Patented Dec. 17, 1957

2,816,370

DRYING APPARATUS CONTROL

Frank H. Richterkessing, Louisville, Ky., assignor to W. M. Cissell Manufacturing Company, Louisville, Ky., a corporation of Kentucky Application February 8, 1954, Serial No. 408,886

13 Claims. (Cl. 34—45)

My invention relates to a control for a drying apparatus of the type employed to dry wet fabrics or the like, and has for one of its objects, improved apparatus of this kind.

A further object of my invention is to provide a control that will permit operation of the heating means of the drying apparatus for a predetermined length of time; for a predetermined length of time at a predetermined temperature; or as an alarm, to notify the operator when a time period has expired, or when the exhaust temperature has reached an amount indicating that the wet fabrics have reached a dry state.

Another object of my invention is to provide a control for a drying apparatus having two perforated drums or baskets rotating within a single casing, in which the air for both baskets is heated by a single heating means and circulated within and exhausted from the casing by a single fan.

A still further object of my invention is to render ineffective the timer and thermostat of either basket while the other basket is operating to dry fabrics, and to permit the timer and thermostat of each basket to be effective when both baskets are operating to dry fabrics.

A further object of my invention is to provide door switches, which are operated when either basket access door is opened, to discontinue operation of the heating means while the door is open, and to stop operation of either basket motor while the corresponding basket access door is open.

A further object of my invention is to provide a control for a drying apparatus of the type disclosed in my earlier filed application, Serial Number 255,790, titled, Apparatus for Drying Fabrics, and filed on November 10, 1951, and issued as Patent 2,687,578.

These and other objects of my invention will be apparent from the following description and claims taken in connection with the accompanying drawing forming a part of this application, in which:

Figure 2:
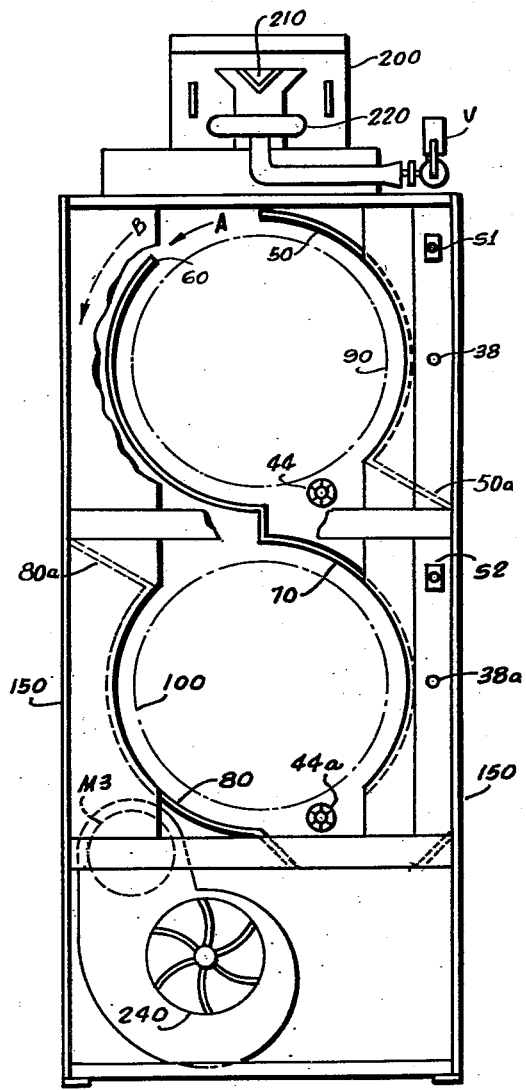
Figure 2 is a schematic view partly in section showing the structure of the multiple basket arrangement according to the invention.

As shown in Fig. 2, the drier apparatus comprises a casing 150 provided with partition walls 50, 50a, 60, 70, 80, and 80a dividing the interior of the casing into upper and lower drying chambers. Conventional foraminous basket or drum type driers are positioned in the respective chambers, as shown by dot-dash lines 90 and 100, and are adapted to be selectively rotated by independent conventional electric motors (not illustrated). At its upper end, casing 150 is provided with a canopy 200 having air inlets 210. The air is drawn into the casing by means of a suction or exhaust fan 240 to follow divided paths around the central partition 60, 70, as shown by arrows A and B. As the air enters inlets 210 it passes over a gas fed heating unit 220. The temperature of the air stream can be regulated by varying the flow of the gas to the heater by means of a solenoid control valve.

Figure 1:
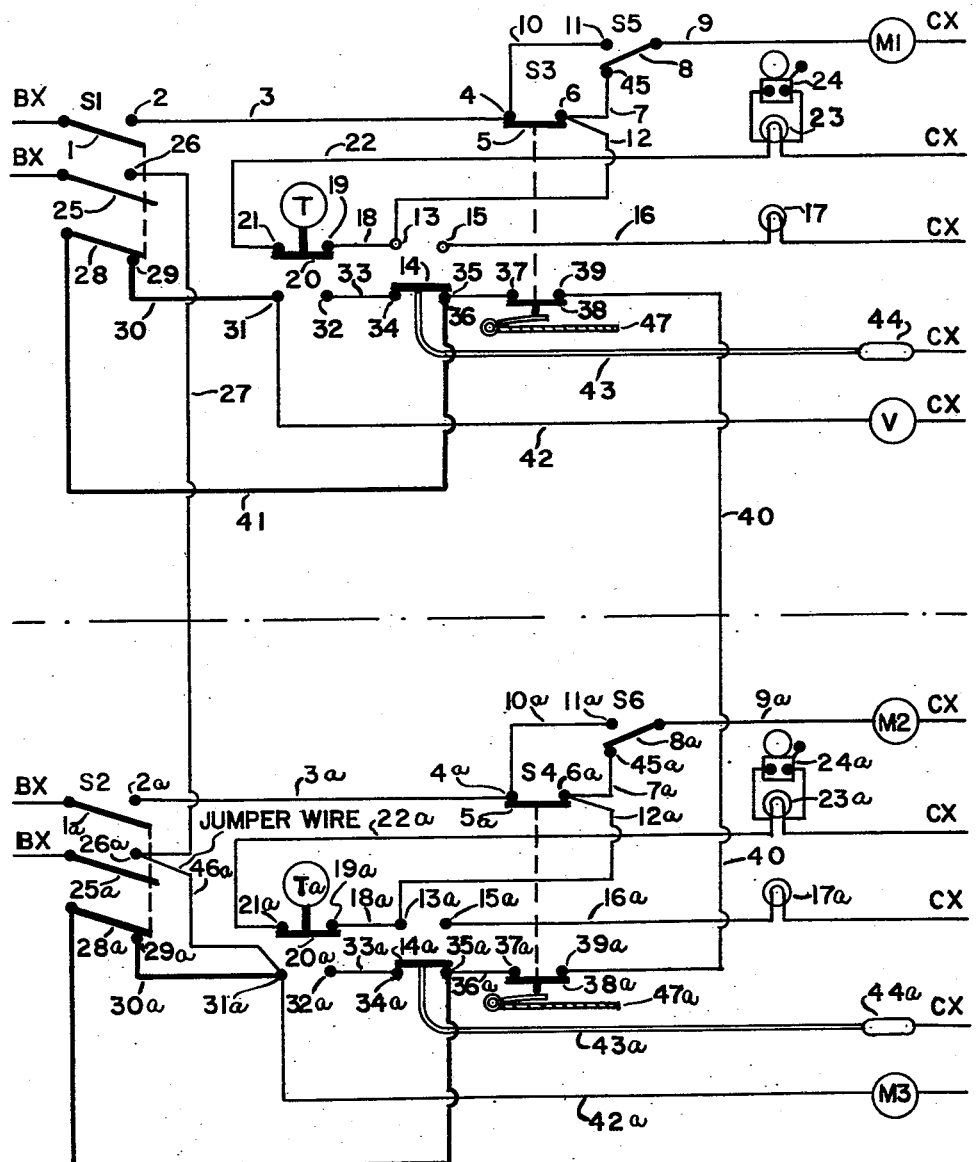
Figure 1 is a wiring diagram of an electrical control for the multiple basket drier embodying my invention.

In accordance with my present invention, separate and identical electrical control devices are provided for the upper and lower baskets of the drier of Fig. 2 as shown in the diagram of Fig. 1. The parts illustrated above the dot-dash line, except the solenoid-operated gas-valve V, are entirely for the upper basket, whereas, the parts illustrated below the dot-dash line, except the fan motor M3, are entirely for the lower basket.

The switch S1 is the main starting-switch for the upper basket motor and controls.

The switch S3 is operated by the access door to the upper basket, the contacts remaining closed when the door 47 is closed, and open while the door 47 is open.

The switch S5 is a selector switch to permit the upper basket motor M1 either to remain in operation while the door is open, or to stop when the door is open.

The timer T is a spring-operated mechanical-timer in which the contacts 19—21 are closed in the timed-out position, and open during the operation of the timer, during which time the contacts 31—32 are closed. Mechanical timers of this type are well known to those skilled in the art, and essentially consist of a spring that is manually wound-up to start the timer in operation. A suitable ratchet mechanism is actuated by the spring to provide the required time-delay, and the length of time is ordinarily determined by the amount a dial or lever is rotated to wind the spring.

The particular mechanical timer employed with my invention is provided with a "hold feature," which mechanically holds the contacts 19—21 permanently open and the contacts 31—32 permanently closed, when the dial or lever is manually rotated to a "hold position" beyond the maximum time setting. To move the timer out of "hold position," the dial or lever is rotated either to a desired time setting or to "zero time." In any "time setting position" the contacts 19—21 are open and contacts 31—32 are closed, and only in the "zero time setting" are contacts 19—21 closed and contacts 31—32 open. The timer can be adjustably set for any time interval from zero to 60 minutes.

The temperature responsive bulb 44 is located in the exhaust air stream of the upper basket, and is connected by a suitable capillary tube and related mechanism to a contact bar 14. In the cold condition of the thermostat, the bar 14 closes contacts 34—35, whereas, in the hot condition, the bar 14 opens contacts 34—35 and closes contacts 13—15. The mechanism associated with the contact bar and the capillary, permits the thermostat to be set at any desired temperature between 60 and 235 degrees F. When the exhaust temperature increases and reaches the temperature setting of the thermostat, the bar 14 causes transfer of the contacts into the "hot condition." Similarly when the exhaust temperature drops below the temperature setting of the thermostat, the bar 14 causes transfer of the contacts into the "cold condition."

The signal light 23 operates to notify the end of the time period, and the bell 24 operates in conjunction with the signal light to provide an audible alarm.

The signal light 17 operates to notify when the thermostat is in the "hot condition."

When the main control switch S1 is in its operating position, and the upper basket access door 47 is closed, the upper basket motor and the fan motor operate.

The operator sets the thermostat, and moves the timer to its desired setting. The solenoid gas valve V operates, and the main gas burner ignites. In this respect, it is to be understood that the main gas burner is provided with an automatic safety pilot that remains lighted while the main burner is off.

If the contact member 8 of the selector switch S5 is in engagement with contact 45, the basket motor M1 and the gas valve V will cut-off when the door switch S3 is open. However, if the contact member 8 of the selector switch S5 is in engagement with contact 11, the basket motor M1 will remain operating when the door switch S3 is open, and only the gas valve V will cut-off.

It is to be noted that the main control switch S1 has a contact member 28 that engages a contact 29 while the switch is in its normal or un-operated position. It is to be also noted that the member 28 and contact 29, via wires 30 and 41, place a shunt about the contacts 31—32 of the timer, and contacts 34—35 of the thermostat, so that the timer and the thermostat are rendered ineffective while the main control switch S1 is in its normal or un-operated position.

This arrangement is one of the salient features of my invention, as the corresponding thermostat and timer are retained ineffective until the corresponding main control switch is operated to start the corresponding basket motor, operate the gas valve V to turn on the main gas burner, and to start the fan motor M3.

Therefore, if only one of the main control switches is operated, only its related apparatuses will be operative, as the main control switch of the other basket will retain its related apparatuses ineffective as long as it is in its normal or un-operated position.

With further reference to Figure 1, it will be noted that corresponding apparatuses for the lower basket have been indicated by the same numeral employed to identify the corresponding apparatus for the upper basket, with a suffix "a" added to clearly distinguish the apparatuses of the upper and lower baskets.

When steam-heating coils are substituted for the gas burner assembly, as disclosed in my aforesaid earlier application, the valve V is a steam-valve installed in the steam supply line connecting the steam coils. Obviously, the steam valve will operate similarly to that described above for the gas solenoid operation, to turn off the steam supply in response to the operation of the control apparatuses.

It is also evident that the wire 42 and the valve V can be omitted on either the gas-fired or steam-heated dryers. Under this arrangement automatic control of the heat will be discontinued, and the respective timers and thermostats will function merely as alarm controls.

It is important that the thermal responsive elements 44 and 44a be installed in the exhaust outlets of each respective basket.

It has been discovered that scorching or other heat damage to fabrics is negligible while the fabrics are wet, and that damage does not occur until after the fabrics reach their dry state.

During the drying of wet fabrics, the majority of the heat supplied is converted to latent heat of vaporization, so that the temperature rise within the exhaust passage of the rotating basket is small while the fabrics remain wet, remaining somewhere in the neighborhood of 150 degrees F. As the fabrics become dry, less heat is converted to latent heat, and more of the supplied heat remains as sensible heat, so that the temperature within the exhaust passage of the rotating basket rises. When the dry state of the fabrics is approached, the temperature rises rapidly, and when the temperature of the exhaust air increases to a value of, for example, 190 or 200 degrees F., the fabrics are relatively dry.

Therefore, placing the thermal responsive elements in the exhaust ducts of the respective baskets, retains the heat input at maximum until a relative dry condition is reached where it is desirable to control the high-heat input and hold the temperature to a value that will not heat damage the fabrics.

It is also to be noted that, when either a timer or thermostat cuts-off the heat, the tumbling of the fabrics and the circulation of air continues to prevent wrinkling of the fabrics.

Ordinarily, the selector switches S5 and S6 are set to provide stopping of a basket, when the corresponding access door is open. However, there are occasions when one or two articles are to be dried with a load requiring considerably more time than that required for the said one or two articles. Under such conditions, it is desirable to set the corresponding selector switch to permit the basket to continue to rotate while the corresponding access door is open. Thus, the tumbling action of the fabrics brings the said one or two articles quickly into view, while the access door is open, thereby effecting not only a saving of time, but providing considerable convenience in removing a few articles from a load at some intermediate time before the full load is dry.

It is to be further understood, that when electric heating elements are substituted for either the gas-fired or steam-heated units, a suitable contactor or relay is substituted for the gas valve V, and the contacts of the relay electrically connected to furnish electric current to the electric heating elements while the coil of the contactor or relay is energized. Thus, the same control is adaptable to gas, steam or electrically heated driers.

To more clearly understand the electrical connections of my control, assume the condition in which switch S1 is operated, switch S5 is set so that contact member 8 engages contact 45, the timer T is set for 15 minutes and the thermostat is set for 200 degrees F.

The wet fabrics are then placed in the upper basket, and the upper access door closed. The signal lights 17 and 23 are now deenergized and the audible alarm 24 is silent.

With switch S1 operated, a circuit is closed from Bx through contact member 1, contact 2, wire 3, contact 4, contact bar 5, contact 6, wire 7, contact 45, contact member 8, wire 9, motor M1 for the upper basket to CX.

A second circuit is closed from contact 6, through wire 12 to contact 13, and thence to contact 19 via wire 18. This places Bx power on contacts 13 and 19. If the contact bar 14, which is actuated by the thermal responsive element 44, opens contacts 34—35 and closes contacts 13—15, a circuit is completed via wire 16 to the temperature signal light 17 and thence to CX.

When the contact bar 20 of the timer T opens contacts 31—32 and recloses contacts 19—21, a circuit is completed via wire 22 to the time signal light 23 and to the bell 24 and thence to CX.

With switch S1 operated, a circuit is closed from Bx through contact member 25, contact 26, wire 27, contact 26a, jumper wire 46a, contact 31a, wire 30a, contact 29a, contact member 28a, wire 41a, contact 35a, wire 36a, contact 37a, contact bar 38a, contact 39a, wire 40, contact 39, contact bar 38, contact 37, wire 36, contact 35, contact bar 14, contact 34, wire 33, contact 32, contact bar 20, contact 31, wire 42 to gas valve V and thence to CX.

Since Bx power is placed on wire 42a via wire 27, wire 42a is energized, thus energizing the fan motor M3.

The fan motor will remain continuously energized as long as switch S1 remains operated.

Likewise, the upper basket motor M1 will remain energized, subject to the control of the door switch S3 and selector switch S5, until the main switch S1 is restored to its normal unoperated position.

As long as switch S1 remains operated, the shunt circuit via wires 30 and 41 is open, and thereby retains the timer T and associate thermostat effective to control the gas valve V.

As long as the switch S2 remains in its normal or unoperated position, the shunt circuit, via wires 30a and 41a is closed, and thereby the timer Ta and the associate thermostat is retained ineffective to control the gas valve V.

Operating switch S2 opens the latter mentioned shunt circuit, and renders the timer Ta and the associate thermostat effective to control the gas valve V. Operating switch S2 also connects Bx power via contact member 25a to contact 26a, thus Bx power is placed on wire 46a to provide control of the gas valve V and the fan motor M3, if the switch S1 is subsequently restored to its normal or unoperated position.

The further operation of the apparatuses below the dot-dash line is similar to that described for the apparatuses above the dot-dash line.

It will be apparent from the foregoing description, that I have provided an improved control for a twin drier, wherein the time and/or temperature may be controlled to provide the results desired.

It will be further apparent, from the foregoing description, that the heating unit is turned off when either timer reaches the end of its time period, or when either thermostat reaches its hot condition.

When fabrics are drying simultaneously in both baskets, the exhaust temperature of one basket may reach the dry state, or temperature setting of its corresponding thermostat, before the load in the other basket is dry.

At this time the temperature signal light will indicate that the dry state or exhaust temperature setting has been reached. The cutting off of the heat at this time will prevent damage to the fabrics in that basket.

If the operator is unable to remove immediately the fabrics from that particular basket, the heat will again be turned-on as soon as the exhaust temperature drops to a point below the hot setting. Therefore, the heat will be maintained at this temperature until the clothes are removed from the basket. If no further fabrics are placed in this basket, the main control switch is turned off, thereby rendering ineffective the timer and thermostat for that basket, and placing the heat under direct control of the timer and thermostat of the other basket. Therefore, as long as both baskets contain wet clothes the high heat condition is called for, but as soon as a dry state, or thermostat setting is reached, the temperature will be retained at that setting to prevent scorching or damage to the fabrics.

Ofttimes it is desirable to dry by a combination of time and temperature by retaining the temperature at a very low setting to prevent damage to synthetic fabrics. The low drying temperature requires a longer time, and the timer setting is then desirable to indicate when the clothes have been in the machine sufficiently long to provide drying.

For fabrics of uniform structure, such as diapers, napkins, etc., the machine can be more efficiently operated by turning the timer to the "hold" position, and setting the thermostat for a dry state temperature, such as 190 or 200 degrees F. When this temperature is reached, the signal will notify the operator, and the heat will be turned off until the temperature drops below the dry state condition.

It is important to note that at no time is the fan or basket motors stopped by the operation of either the timer or thermostat, as it has been found that damage often occurs to fabrics lying in contact with the hot metal basket after the basket is brought to stop. In the past it has been found necessary to operate the baskets with the fan on for a predetermined time after the dry state condition has been reached to cool the load and thus permit stopping of the basket. However, in commercial laundries this has been found to be an objection as this auxiliary cooling period decreases the productive drying capacity of the machines per unit of time. Not only does the cooling period provide a direct loss of time, but there is also a loss of time encountered by reason of the extra time required to again raise the machine to a drying temperature.

While I have illustrated my invention in only one form, it will be obvious to those skilled in the art that it is not so limited, but is susceptible of various changes and modifications without departing from the spirit thereof, and I desire, therefore, that only such limitations shall be placed thereupon as are specifically set forth in the following claims.

I claim:

1. In apparatus for drying fabrics or the like, including a casing having an air inlet and an air outlet; means for moving air within the casing from the inlet to the outlet; means for heating the air entering the air inlet; means within the casing dividing the air moving from the inlet to the outlet into two separate streams; a perforated container for receiving fabrics to be dried, and rotatably mounted within one of the air streams; a second perforated container for receiving fabrics to be dried, and rotatably mounted within the other air stream; means for rotating the first mentioned container, and means for rotating the second mentioned container; a first thermostat, responsive to the temperature of the air in the first mentioned air stream after the said air has moved beyond the container mounted therein, for controlling the operation of the heating means; a second thermostat, responsive to the temperature of the air in the second mentioned air stream after the said air has moved beyond the container mounted therein, for controlling the operation of the heating means; a first timer, manually movable to a timing position, to control the operation of the heating means; a second timer, manually movable to a timing position, to control the operation of the heating means; a first switch, manually movable to start and stop positions, for respectively starting and stopping operation of the heating and air moving means, and the means for rotating the first mentioned container; a second switch, manually movable to start and stop positions, for respectively starting and stopping the heating and air moving means, and the means for rotating the second mentioned container; means, operating when the said first switch is in its stop position, to render ineffective the said first thermostat and first timer to control the operation of the heating means; and means, operating when the said second switch is in its stop position, to render ineffective the said second thermostat and second timer to control the operation of the heating means.

2. The combination as claimed in claim 1, including means operatively associated with the said first timer, and manually movable into and out of a hold position, to render ineffective the first timer to control the heating means when moved to its said hold position; and means, operatively associated with the said second timer, and manually movable into and out of a hold position, to render ineffective the said second timer to control the heating means when moved to its hold position.

3. In apparatus for drying fabrics or the like, including a casing having an air inlet and an air outlet; means for moving air within the casing from the inlet to the outlet; means for heating the air entering the air inlet; means within the casing dividing the air moving from the inlet to the outlet into two separate air streams; a perforated container for receiving fabrics to be dried, and rotatably mounted within one of the air streams; a second perforated container for receiving fabrics to be dried, and rotatably mounted within the other air stream; means for rotating the first mentioned container, and means for rotating the second mentioned container; a first thermostat, responsive to the temperature of the air in the first mentioned air stream, for controlling the operation of the heating means; a second thermostat, responsive to the temperature of the air in the second mentioned air stream, for controlling the operation of the heating means; a first switch, manually movable to start and stop positions, for respectively starting and stopping operation of the heating and air moving means, and the means for rotating the first mentioned container; a second switch, manually movable to start and stop positions, for respectively starting and stopping operation of the heating and air moving means, and the means for rotating the second mentioned container; means, operating when the said first switch is in its stop position, to render ineffective the said first thermostat to control the said heating means; and means, operating when the said second switch is in its stop position, to render ineffective the said second thermostat to control the heating means.

4. The combination as claimed in claim 3, including signaling means, operatively associated with the said first thermostat, indicating when the said first thermostat has operated to control the operation of the said heating means; and a second signaling means, operatively associated with the said second thermostat, indicating when the said second thermostat has operated to control the operation of the said heating means.

5. In apparatus for drying fabrics or the like, the combination of a first rotatable perforated container to receive fabrics to be dried; a second rotatable perforated container to receive fabrics to be dried; means for rotating the first mentioned container, and means for rotating the second mentioned container; electrically controlled heating means common to said containers for supplying heated air jointly thereto in separate flow paths, and means for exhausting air from said containers in a single flow path; a first thermostat, responsive to the temperature of the air in the first mentioned container, for controlling the operation of the heating means; a second thermostat responsive to the temperature of the air in the second mentioned container, for controlling the operation of the heating means; a first switch, manually movable to start and stop positions, for respectively starting and stopping operation of the heating and air exhausting means, and the means for rotating the first mentioned container; a second switch, manually movable to start and stop positions, for respectively starting and stopping operation of the heating and air exhausting means, and the means for rotating the second mentioned container; means, operating when the said first switch is in its stop position, to render ineffective the said first thermostat to control the heating means; and means, operating when the said second switch is in its stop position, to render ineffective the said second thermostat to control the heating means.

6. In apparatus for drying fabrics or the like, including a casing having an air inlet and air outlet; means for moving air within the casing from the inlet to the outlet; means for heating the air within the casing; means within the casing dividing the air moving from the inlet to the outlet into two separate air streams, a rotatable drying basket disposed in each of said air streams for independently drying wet fabrics placed within each basket; a first thermostat, responsive to the temperature of the air within one of said air streams, for controlling the operation of the heating means; a second thermostat, responsive to the temperature of the air within the other air stream, for controlling the operation of the heating means each of said first and second thermostats being disposed downstream from the associated basket in said stream; a first switch, manually movable to start and stop positions, for respectively starting and stopping the heating and air moving means; a second switch, manually movable to start and stop positions, for respectively starting and stopping operation of the heating and air moving means; means, operating when the said first switch is in its stop position, to render ineffective the said first thermostat to control the operation of heating means; and means, operating when the said second switch is in its stop position, to render ineffective the said second thermostat to control the operation of the heating means.

7. In apparatus for drying fabrics or the like, including a casing having an air inlet and an air outlet; means for moving air within the casing from the inlet to the outlet; means for heating the air within the casing; means within the casing dividing the air moving from the inlet to the outlet into two separate air streams a rotatable drying basket disposed in each of said air streams for independently drying wet fabrics placed within each basket; a first thermostat, responsive to the temperature of the air within one of said air streams, for controlling the operation of the heating means; a second thermostat, responsive to the temperature of the air within the other air stream, for controlling the operation of the heating means each of said first and second thermostats being disposed downstream from the associated basket in said stream; a first timer, manually movable to a timing position, to control the operation of the heating means; a second timer, manually movable to a timing position, to control the operation of the heating means; a first switch, manually movable to start and stop positions, for respectively starting and stopping the heating and air moving means; a second switch, manually movable to start and stop positions, for respectively starting and stopping operation of the heating and air moving means; means, operating when the said first switch is in its stop position, to render ineffective the said first thermostat and first timer to control the operation of the heating means; and means, operating when the said second switch is in its stop position, to render ineffective the said second thermostat and second timer to control the operation of the heating means.

8. The combination as claimed in claim 7, including means, operatively associated with the said first timer, and manually movable into and out of a hold position, to render ineffective the said first timer to control the heating means, when moved to its said hold position; and means, operatively associated with the said second timer, and manually movable into and out of a hold position, to render ineffective the said second timer to control the heating means, when moved to its hold position.

9. The combination as claimed in claim 7, including signaling means, operatively associated with the said first switch and first thermostat, indicating when the said first thermostat has operated to control the operation of the said heating means; and a second signaling means, operatively associated with the said second switch and second thermostat, indicating when the said second thermostat has operated to control the operation of the said heating means.

10. In apparatus for drying fabrics or the like, including a casing having an air inlet and an air outlet; means for moving air within the casing from the inlet to the outlet; means for heating the air entering the air inlet; means within the casing dividing the air moving from the inlet to the outlet into two separate air streams, a rotatable drying basket disposed in each of said air streams for independently drying wet fabrics placed within each basket; a first dry alarm indicator for one of the said air streams, and a second dry alarm indicator for the other air stream; a first thermostat, responsive to the temperature of the air within the said one air stream after the air has moved over the fabrics placed therein, for actuating the first dry alarm indicator when the temperature of the air affecting the said first thermostat reaches a predetermined setting; a second thermostat, responsive to the temperature of the air within the said other air stream after the air has moved over the fabrics placed therein, for actuating the second dry alarm indicator when the temperature of the air affecting the said second thermostat reaches a predetermined setting; a first switch, manually movable to start and stop positions for respectively starting and stopping operation of the air moving means; a second switch, manually movable to start and stop positions, for respectively starting and stopping operation of the air moving means; means, operating when the said first switch is in its stop position, to render ineffective the said first thermostat to actuate the said first dry alarm; and means, operating when the second switch is in its stop position, to render ineffective the said second thermostat to actuate the said second dry-alarm.

11. In a drying apparatus having a casing enclosing a pair of separate drying compartments, electrically controlled heating means common to said compartments for supplying heated air jointly thereto in separate flow paths, means common to said compartments for exhausting air therefrom in a single flow path, a rotatable drier basket in each compartment having a separate motor and circuit therefor for driving the basket, an access door into each basket and door switch means in the circuit to the basket motor associated with said door and normally operable to stop said motor when said door is opened during operation, and separate stop and start switches in the circuits to said basket motors for independently controlling the operation of said respective baskets; the improvement comprising a control means, including a thermostat disposed in each compartment downstream from the basket therein, a separate switch in series circuit with the corresponding door switch and said heating means controlled by said thermostat and a shunt circuit associated with each of said stop and start switches for completing a circuit around said associated separate switch while the associated stop and start switch is open, whereby said heating means may be interrupted when one or more of said access doors is opened during operation and when one or more of said thermostats reaches a predetermined temperature during operation.

12. Apparatus as defined in claim 11, including a timer means in series circuit with each of said separate switches and having a timer switch for interrupting said heating means upon the expiration of a predetermined period of time.

13. Apparatus so defined in claim 11, including a signal circuit associated with each of said thermostats and adapted to be closed by said associated thermostat when said thermostat reaches a predetermined temperature.

References Cited in the file of this patent

UNITED STATES PATENTS

| | | |
|---|---|---|
| 2,619,734 | Geldhof et al. | Dec. 2, 1952 |
| 2,645,032 | Hammell | July 14, 1953 |
| 2,670,548 | Huebsch | Mar. 2, 1954 |
| 2,712,182 | Vetorino | July 5, 1955 |